(12) United States Patent
Crippa et al.

(10) Patent No.: US 11,098,773 B2
(45) Date of Patent: Aug. 24, 2021

(54) BRAKE CALIPER AND AT LEAST ONE PAD ASSEMBLY

(71) Applicant: FRENI BREMBO S.P.A., Curno (IT)

(72) Inventors: Cristian Crippa, Curno (IT); Mauro Mambretti, Curno (IT)

(73) Assignee: Freni Brembo S.p.A., Curno (IT)

( * ) Notice: Subject to any disclaimer, the term of this patent is extended or adjusted under 35 U.S.C. 154(b) by 68 days.

(21) Appl. No.: 16/630,901

(22) PCT Filed: Jul. 11, 2018

(86) PCT No.: PCT/IB2018/055106
§ 371 (c)(1),
(2) Date: Jan. 14, 2020

(87) PCT Pub. No.: WO2019/012443
PCT Pub. Date: Jan. 17, 2019

(65) Prior Publication Data
US 2020/0149600 A1    May 14, 2020

(30) Foreign Application Priority Data

Jul. 14, 2017   (IT) .................... 102017000079579

(51) Int. Cl.
*F16D 55/228*   (2006.01)
*F16D 65/18*    (2006.01)
(Continued)

(52) U.S. Cl.
CPC ....... *F16D 55/228* (2013.01); *F16D 65/0979* (2013.01); *F16D 65/183* (2013.01);
(Continued)

(58) Field of Classification Search
CPC .. F16D 55/228; F16D 65/097; F16D 65/0979; F16D 65/14; F16D 65/183
(Continued)

(56) References Cited

U.S. PATENT DOCUMENTS

| 4,467,897 A | 8/1984 | Kubo et al. |
| 4,609,077 A | 9/1986 | Nakatsuhara |

(Continued)

FOREIGN PATENT DOCUMENTS

| DE | 4318744 C1 | 9/1994 |
| DE | 4335001 A1 | 4/1995 |

(Continued)

OTHER PUBLICATIONS

European Patent Office, International Search Report with Written Opinion, issued in PCT/EP2018/055106, dated Sep. 25, 2018, 12 pages, European Patent Office, Rijswijk, Netherlands.

*Primary Examiner* — Christopher P Schwartz
(74) *Attorney, Agent, or Firm* — Marshall & Melhorn, LLC (57) ABSTRACT

A brake caliper and a pad assembly may have a pad retention device securely attached to a brake pad. The brake caliper may have an actuation device of movement and application of a braking action, along a thrust direction, to the brake pad to abut it against a braking surface of a disc. The actuation device may have an actuation device seat having a seat opening, where the seat receives a retention device coupling portion of the retention device through the seat opening. The assembly may have a coupling ring accommodated in the seat, leaving a radial clearance, free to move in a radial direction and leaving an axial clearance, free to move in an axial direction parallel to the thrust device thrust direction and limited in its stroke so as not to escape from the seat during use.

11 Claims, 7 Drawing Sheets

(51) Int. Cl.
| | | |
|---|---|---|
| *F16D 65/097* | (2006.01) | |
| *B60T 1/06* | (2006.01) | |
| *F16D 65/00* | (2006.01) | |
| *F16D 55/00* | (2006.01) | |
| *F16D 121/04* | (2012.01) | |
| *F16D 125/06* | (2012.01) | |

(52) U.S. Cl.
CPC ........... *B60T 1/065* (2013.01); *F16D 65/0068* (2013.01); *F16D 2055/0016* (2013.01); *F16D 2121/04* (2013.01); *F16D 2125/06* (2013.01)

(58) Field of Classification Search
USPC .................... 188/73.36–73.38, 250 B, 250 G
See application file for complete search history.

(56) References Cited

U.S. PATENT DOCUMENTS

| | | | |
|---|---|---|---|
| 4,809,825 A | | 3/1989 | Oltmanns, Jr. et al. |
| 5,427,213 A | * | 6/1995 | Weiler ................ F16D 65/0006 188/250 E |
| 5,494,140 A | | 2/1996 | Weiler et al. |
| 5,701,978 A | * | 12/1997 | Weiler ................ F16D 65/0979 188/73.32 |
| 5,704,452 A | | 1/1998 | Maligne |
| 5,706,916 A | | 1/1998 | Cortes Guasch et al. |
| 5,860,495 A | * | 1/1999 | Weiler ................ F16D 65/0979 188/73.38 |
| 5,881,848 A | | 3/1999 | Mery et al. |
| 6,634,469 B2 | | 10/2003 | Storzel et al. |
| 8,776,956 B2 | | 7/2014 | Ruiz et al. |
| 10,174,840 B2 | | 1/2019 | Ruiz et al. |

FOREIGN PATENT DOCUMENTS

| | | |
|---|---|---|
| DE | 19537928 A1 | 4/1997 |
| DE | 19617373 A1 | 11/1997 |
| DE | 19857559 A1 | 6/2000 |
| DE | 19906804 A1 | 8/2000 |

\* cited by examiner

BRAKE CALIPER AND AT LEAST ONE PAD ASSEMBLY

FIELD OF THE INVENTION

The present invention relates to a brake caliper and brake pad assembly for a braking system, for example, but not necessarily exclusively, for a vehicle.

In particular, the present invention relates to a brake caliper suitable for receiving at least one actuation device provided with mechanical system capable of anchoring at least one pad of the brake caliper to prevent the pad from remaining in contact with the braking surfaces of the brake disc when the braking action stops, thus creating a residual braking torque for example, on the vehicle.

More specifically, the present invention relates to brake calipers of the type commonly known with the term "spot type".

The present invention also relates to a disc brake and also to a vehicle, comprising said assembly and/or said brake caliper.

More specifically, the present invention relates to a braking device particularly suitable, but not necessarily intended, for vehicles.

BACKGROUND ART

The brake caliper in a disc brake is generally arranged straddling the outer peripheral margin of a brake disc, suitable for rotating about a rotation axis defining an axial direction (A-A). Moreover, in a disc brake there is defined a radial direction (R-R) which is substantially orthogonal to said axial direction (A-A), and a tangential (T-T) or circumferential direction (C-C), orthogonal both to said axial direction (X-X) and to said radial direction (R-R).

Brake calipers are restrained to a support structure which remains stationary with respect to the vehicle wheel, such as for example an axle-journal of a suspension of a vehicle or a hub of a vehicle wheel or a fork or a swingarm of a motor vehicle. The brake caliper usually comprises a caliper disc body having two elongated portions arranged facing opposite braking surfaces of a brake disc, and at least one bridge which connects said two elongated portions to each other. Due to actuation devices, the conveniently actuated calipers press the pads against the braking band and the braking action is generated by the friction between the pads and the braking band of the brake disc.

In known brake calipers, there are also piston retracting devices, such as the pad actuation device, as mentioned above, adapted to actuate at least one brake caliper pad. The aforesaid piston is adapted to axially translate said pads by bringing each pad into contact with force against a respective friction surface of the disc, thus generating a braking friction torque that opposes the direction of rotation of the disc. The aforesaid piston is slidingly actuated, in a respective seat formed in the caliper body, stressed by means of a pressurized brake fluid supplied by a distribution system in a controlled manner by a user in order to carry out braking.

The retracting device allows the piston to return to the respective seat at the end of the stressing of the pressurized brake fluid, thus allowing the pads to move away from the disc friction surfaces and preventing the pads from involuntarily remaining in contact with the disc also after the end of the braking action. This would indeed cause the disadvantage of the persistence of a residual braking torque, with the negative effect of an unacceptable reduction of performance of the moving vehicle and an increased and quick consumption of the pads and disc.

Moreover, in the cases of increased braking pressures, also the caliper body may be elastically deformed, thus moving away from the disc friction surface due to the effect of the thrust force against the disc friction surfaces. At the end of such a stressing of the brake fluid, the caliper body elastically resumes its initial shape, moving also the piston and the pads close to the disc friction surfaces again. Indeed, the piston is to have a total return stroke equal to the sum of the space travelled to compensate for the distance between pad and disc, and to the elastic return of the caliper body and the pads. Under such conditions, the pad could remain pressed against the disc friction surface also after the end of the stressing of the brake fluid, with the aforesaid negative consequences.

The need is felt in at least certain applications to cause the piston to retract in conjunction with the brake pad, thus preventing it from remaining in contact with the disc braking surfaces.

Certain embodiments are known from U.S. Pat. Nos. 4,467,897, 4,609,077, 4,809,825, 5,494,140, 5,701,978, 5,704,452, 5,706,916, 5,860,495, 5,881,848, DE4318744, DE4335001, DE19617373, DE19857559, DE19906804.

A solution of this type is disclosed for example, in document U.S. Pat. No. 6,634,469 by Continental Teves, AG & Co. OHG.

This known solution refers to a "spot" type of disc brake for motor vehicles with a retention device for a brake pad which couples to a thrust piston. This retention device is locked to the assembly support or plate of the pad. The retention function is carried out by two springs separated from each other. A first spring locks the pad axially with respect to the pistons, and a second spring secures the retention device to the pad plate. Both springs are actively independent from each other so as to prevent undesired transverse forces on the pistons, that is transversely to the axial direction.

These known compensation systems of the related position of the system for coupling the pad to the thrust pistons of a caliper provide complex retention solutions with clearance of a plurality of springs for coupling to the pad body, thus being complex to build and manage for maintenance. Indeed, at each replacement of the pads, also the whole retention device in its entirety is forcibly replaced with both springs.

Moreover, these known solutions are not always capable of compensating for the braking system tolerances, particularly the operating ones, rather usually only the assembly ones.

This known solution also slows down the assembly operations of the pad in the caliper in case of maintenance and replacement of the worn pads with new pads. Indeed, this known solution provides for a spring coupling device to be slidingly movable with respect to the pad itself. Therefore, for production and assembly and packaging and transport conditions, the known spring coupling device will almost always be in a related position with respect to the pad which is different and almost never centered with respect to the seat which should receive it in the piston, thus making the coupling operations, and therefore the pad replacement operations, not very easy and even difficult, operations which now, due to scheduled maintenance operations and increasingly contained price, are to occur in very quick times but while always protecting the completeness and safety of the correct coupling.

Moreover, when there are provided several pistons on each caliper side and therefore pads suitable for facing several pistons, the problem is accentuated and at times is very complex to resolve since a plurality of movable retention devices are to be simultaneously centered, each independently from one another on the same pad.

The radial and tangential locking engagement of the springs in the piston induces undesired transverse forces on the brake piston which may result in the tilting of the brake and thus cause undesired frictions during the movement of the piston itself. Moreover, the manufacturing tolerances of the pad and of the caliper at times generate an uncentered positioning in radial or tangential direction of the pad with respect to the piston. This means that further undesired transverse forces occur on the piston and on the caliper body due to these tolerances. In turn, this accordingly results in a thrust of the piston which is not perfectly transverse to the pad, and therefore to the brake disc, and accordingly, an undesired variation of the braking torque. The results of the variations of the braking torque of the brake result in for example, the occurrence of undesired vibrations such as steering-wheel vibrations and therefore at times a noise or low-frequency buzzing or high-frequency whistles.

Thus, the need is strongly felt to couple the brake pad to the actuation device, thus preventing stresses which are at least transverse to the thrust direction of the actuation device, and at the same time simplify manufacturing the pad and facilitate the assembly operations of the pad or the replacement operations of the worn pad.

In particular, the need is strongly felt to make the assembly operation, and therefore the vehicle maintenance, quick, in particular of the braking system when replacing the brake pads, however while always ensuring the maximum reliability, safety of the operation.

Solution

It is an object of the present invention to obviate the drawbacks of the prior art.

It is an object of the present invention to provide for a brake caliper and at least one pad assembly which allows a safe and always reliable coupling of the pad to the actuation device to be had also when the system assembly and operating construction tolerances are significant, thus improving the solution with respect to the known ones.

DRAWINGS

Further features and advantages of the device, of the disc brake and of the vehicle will become apparent from the description provided below of preferred embodiments thereof, given by way of non-limiting examples, with reference to the accompanying drawings, in which.

DESCRIPTION OF SOME PREFERRED EMBODIMENTS

Figure 1:
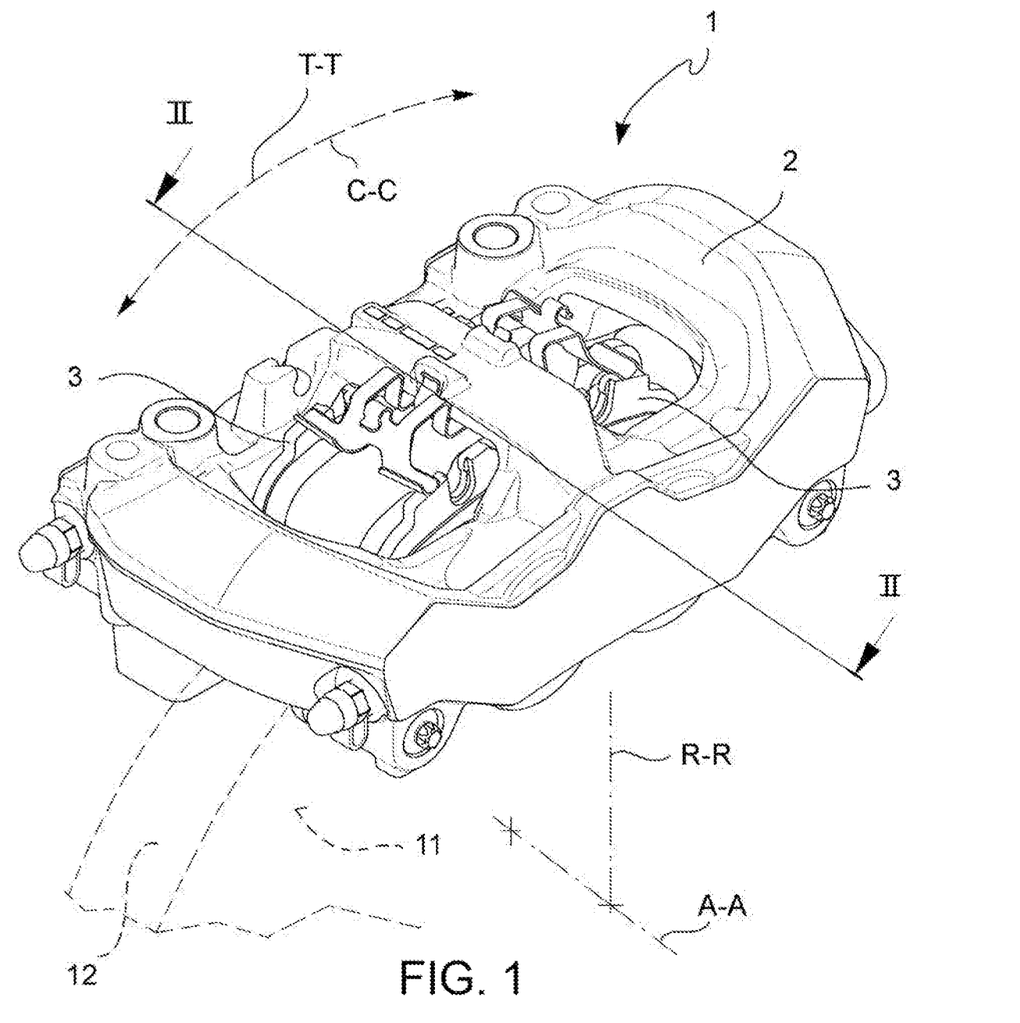
FIG. 1 is an axonometric view of a brake caliper and pad assembly.
Figure 2:
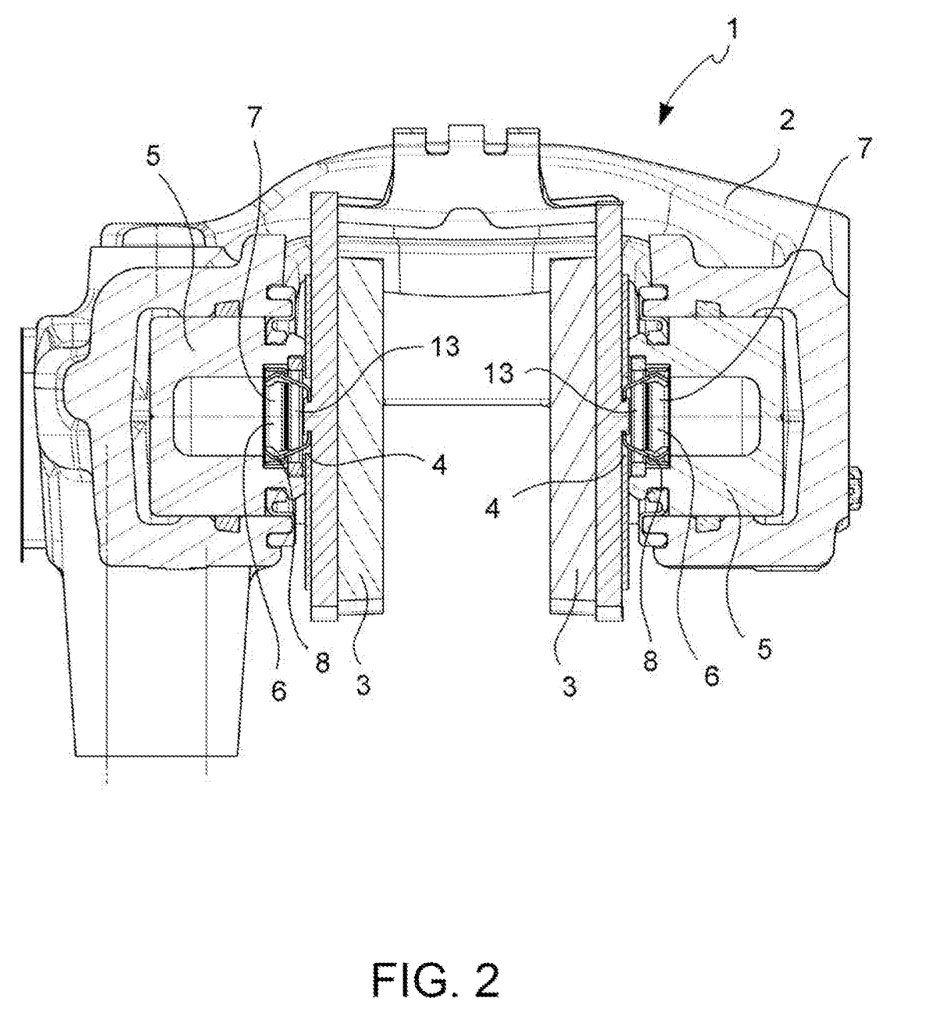
FIG. 2 shows a section according to line II-II in FIG. 1, of the assembly in FIG. 1.
Figure 3:
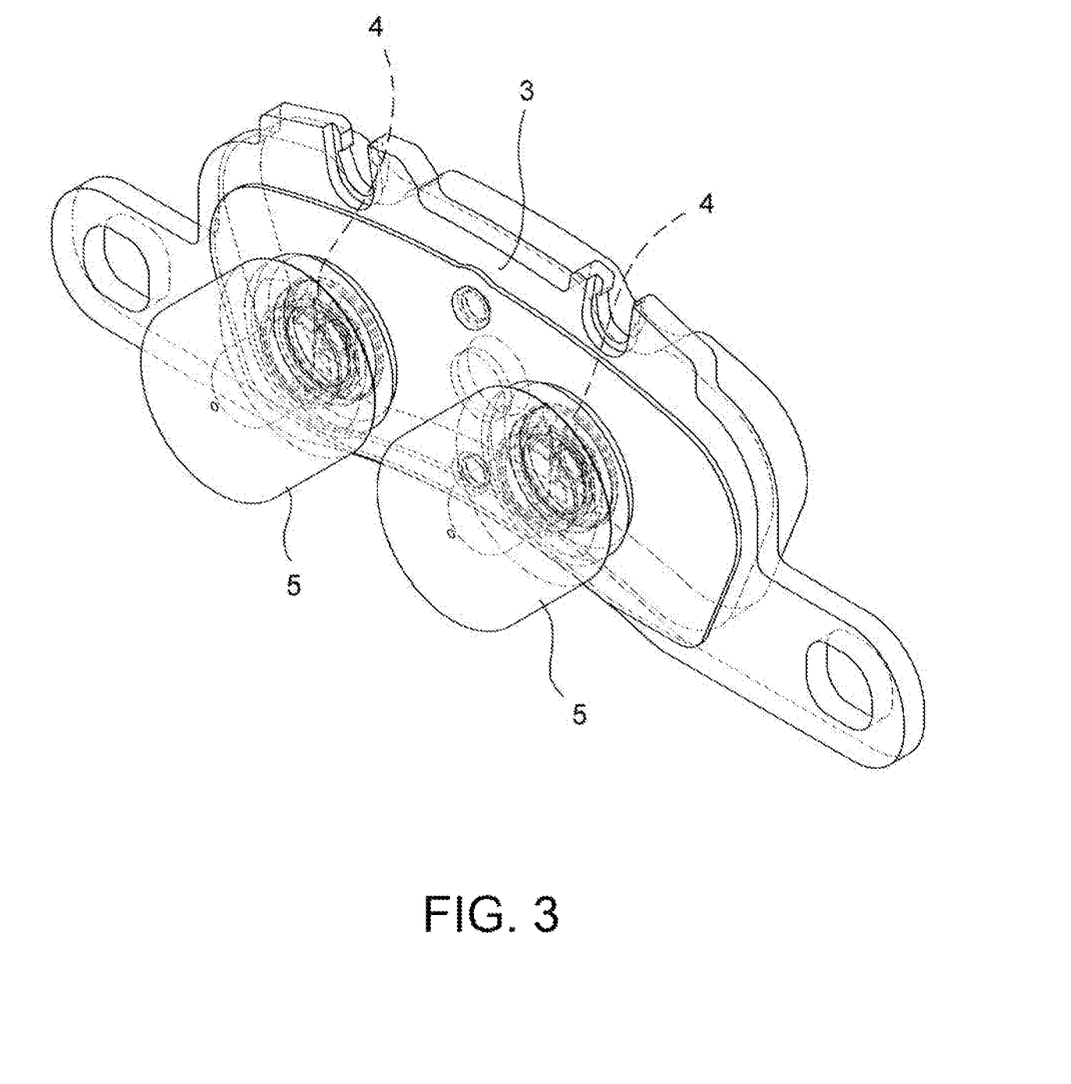
FIG. 3 depicts an axonometric view of an actuation device and a brake pad assembly according to the invention, in which certain hidden components are indicated with a dotted line.

According to a general embodiment of the invention, there is provided a brake caliper and at least one pad assembly, indicated as a whole with numeral 1. Said assembly 1 comprises a brake caliper 2 and at least one brake pad 3.

Figure 4:
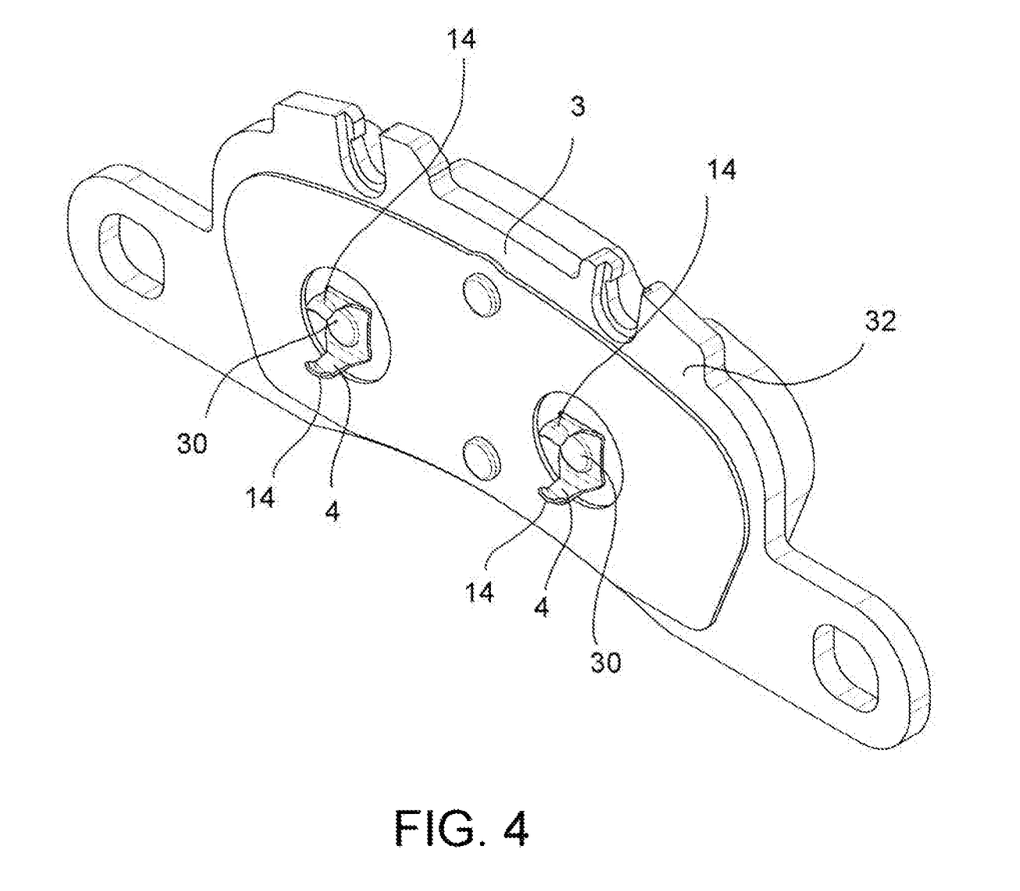
FIG. 4 shows an axonometric view of the brake pad in FIG. 3.

Said at least one brake pad 3 comprises at least one pad retention device 4.

Said retention device 4 is securely attached to said brake pad 3 so as to prevent a related movement thereof with respect to the brake pad 3 during the normal use thereof. According to one embodiment, it is prevented to provide any related clearance between the retention device 4 and the brake pad 3, in particular the pad plate 32 thereof.

Said brake caliper 2 comprises at least one actuation device 5 of movement and application of a braking action, along a thrust direction X-X, to said brake pad 3 to abut it against at least one braking surface 11 of a disc of a disc brake 12. According to one embodiment, said actuation device is a cylinder and hydraulic piston assembly, for example operated by a brake fluid pressurized with a brake pump of a braking system. According to one embodiment, said actuation device is an electrically-actuated piston controlled by a motor unit or an electrically-operated geared motor.

Figure 5:
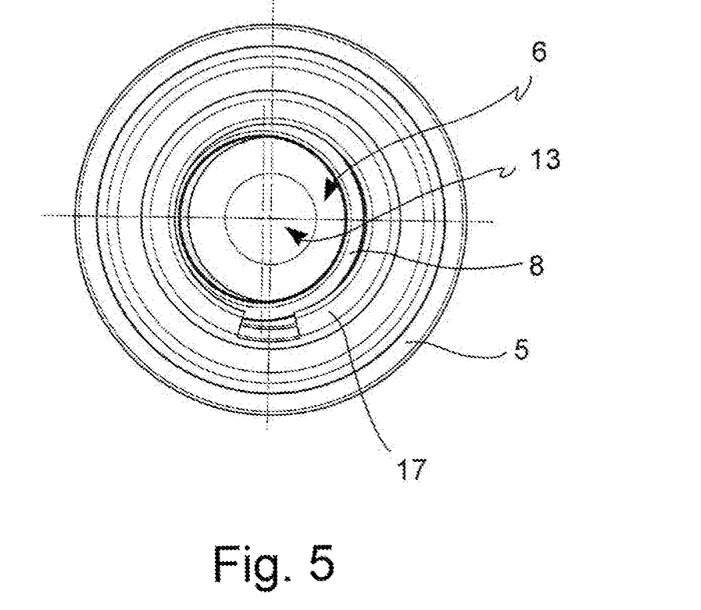
FIG. 5 and FIG. 6 show a view according to the thrust axis of the actuation device and an axonometric view of an actuation device.
Figure 6:
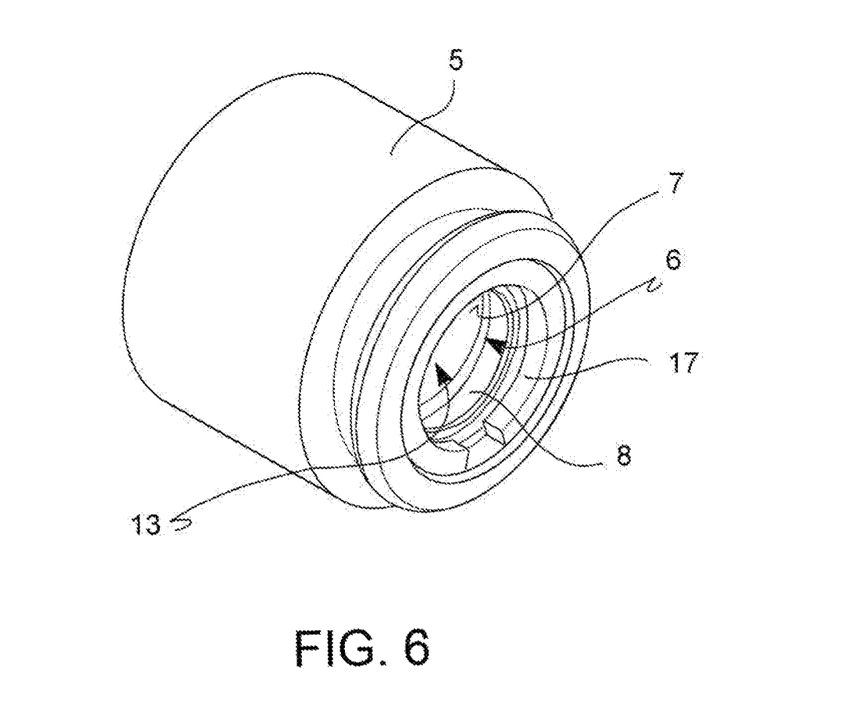

Said actuation device 5 defines a radial direction Z-Z orthogonal to the thrust direction of the actuation device X-X.

Figure 7:
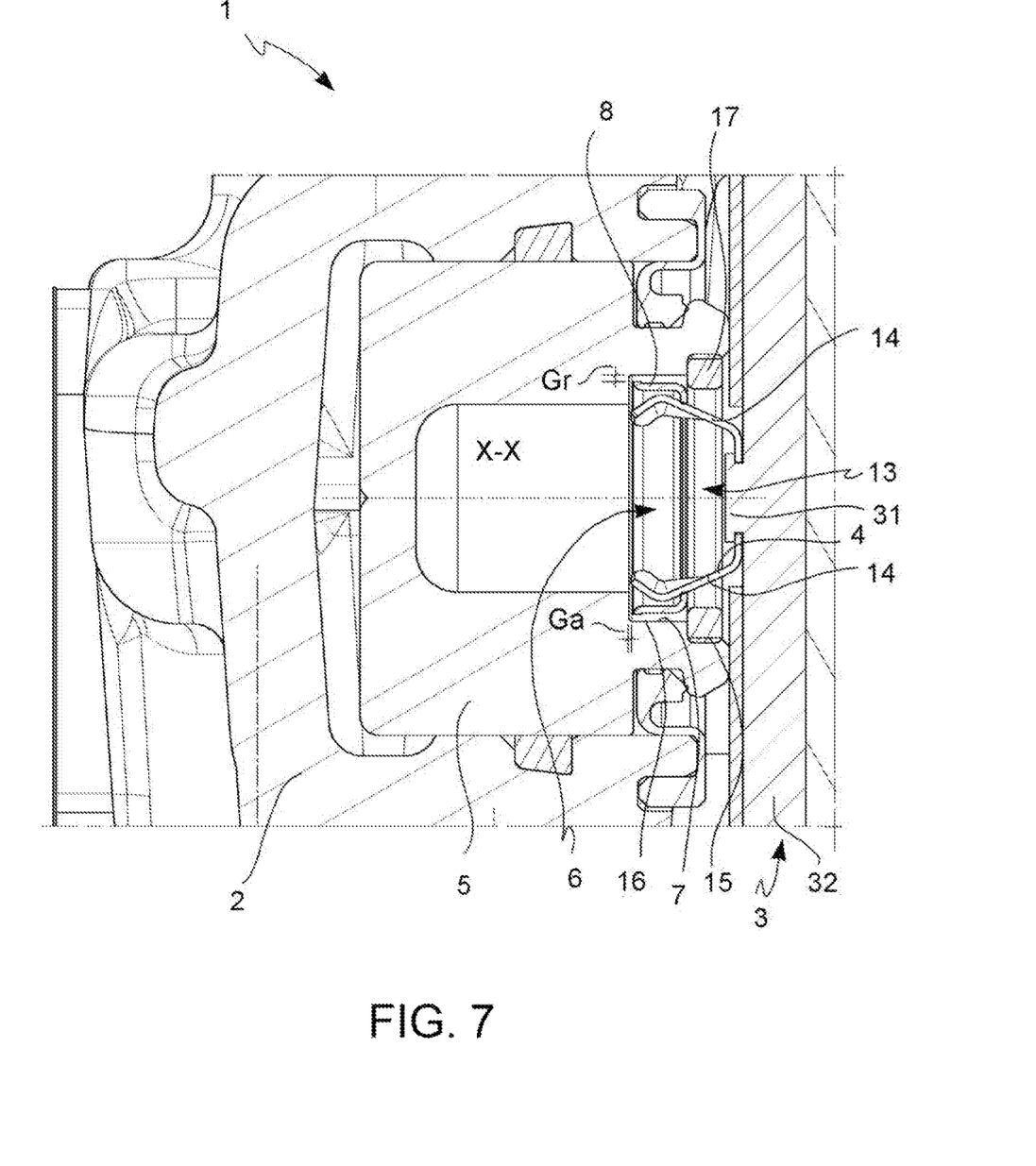
FIG. 7 depicts an enlarged detail of the section in FIG. 2.
Figure 8:
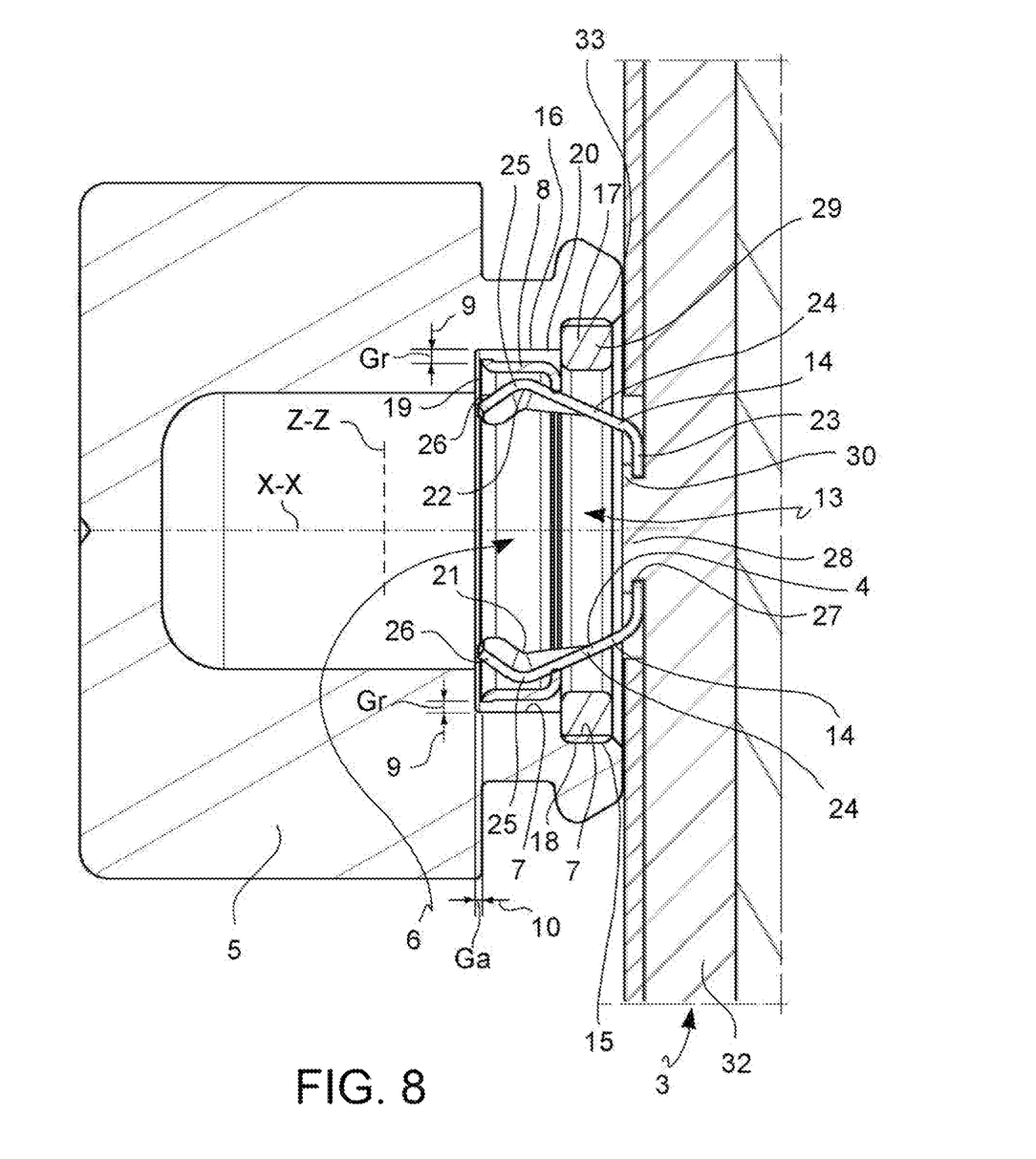
FIG. 8 shows a cross section of an enlarged detail of the actuation device and brake pad assembly.

Advantageously, each actuation device 5 comprises at least one actuation device seat 6 having at least one seat opening 13 substantially facing said brake pad 3.

Said seat 6 receives at least one retention device coupling portion 14 of said retention device 4 through said seat opening 13.

Said assembly comprises at least one coupling ring 8.

Said coupling ring 8 is accommodated in said seat 6 leaving a radial clearance (hereinafter indicated with numeral Gr) between said coupling ring 8 and said seat 6.

Said coupling ring 8 is free to move in a radial direction parallel to the thrust device radial direction Z-Z.

Said coupling ring 8 is accommodated in said seat 6 leaving an axial clearance (hereinafter indicated with numeral Ga) between said coupling ring 8 and said seat 6.

Said coupling ring 8 is free to move in an axial direction parallel to the thrust device thrust direction X-X and is limited in its stroke so as to prevent it from escaping from said seat 6 during the normal use of assembly 1.

Said retention device coupling portion 14 of said retention device 4 is removably snappingly coupled to said coupling ring 8, removably connecting the at least one brake pad 3 with the at least one actuation device 5 during the normal use of the at least one brake pad 3 in assembly 1.

According to one embodiment, said seat 6 is delimited by seat walls 7 and said coupling ring 8 is accommodated in said seat 6 leaving a radial clearance Gr between said coupling ring 8 and said seat 6.

Said coupling ring 8 is free to move in a radial direction parallel to the thrust device radial direction Z-Z limited by the seat walls 7.

According to one embodiment, said coupling ring 8 is accommodated in said seat 6 leaving an axial clearance Ga between said coupling ring 8 and said seat 6. According to one embodiment, said axial clearance is cancelled when the pad retention device is inserted into the coupling ring.

Said coupling ring 8 is free to move in an axial direction parallel to the thrust device thrust direction X-X and is limited in its stroke at least on one side by the seat walls 7 so as to prevent it from escaping from said seat during the normal use thereof.

According to one embodiment, said seat 6 comprises a seat bottom wall 19.

According to one embodiment, said assembly comprises a stopping element 17 arranged on the side substantially opposite to said seat bottom wall 19, said stopping element 17 projects at least partially in said seat 6 to delimit the stroke of said coupling ring 8.

According to one embodiment, said seat 6 has a first seat portion 15 having a predefined transverse dimension or inside inner diameter (hereinafter indicated with numeral Dfp).

According to one embodiment, said first seat portion 15 is at least partially within the seat walls 7 forming a coupling seat 33 with at least a portion thereof not directly facing said seat opening 13.

According to one embodiment, said seat 6 comprises a second seat portion 16 having a predefined transverse dimension or inside inner diameter (hereinafter indicated with numeral Dsp).

According to one embodiment, said assembly comprises a stopping element 17 received in a first seat portion 15.

Said stopping element 17 is received and snappingly coupled in said first seat portion 15.

According to a further embodiment, said stopping element 17 is received and screwed to said first seat portion 15.

According to one embodiment, at least one stopping element wall 20 is facing a seat bottom wall 19.

According to one embodiment, a distance (hereinafter indicated with numeral ds) from a seat bottom wall 19 and a stopping element wall 20 is defined.

According to one embodiment, an inner transverse dimension, or inside inner diameter, of stopping element (hereinafter indicated with numeral Dse) is defined.

According to one embodiment, said stopping element 17 comprises a stopping element body 29 which has an open annular extension for the snap insertion thereof into said first seat portion 15.

According to one embodiment, said coupling ring 8 has a predefined coupling ring outer transverse dimension, or outer diameter (hereinafter indicated with numeral Dre).

According to one embodiment, said coupling ring 8 has a predefined coupling ring minimum inner transverse dimension, or minimum inner diameter (hereinafter indicated with numeral Dri).

According to one embodiment, said coupling ring 8 has a predefined dimension in direction of the thrust direction X-X of coupling ring (hereinafter indicated with numeral drx).

According to one embodiment, said retention device 4 comprises at least one retention device arm 21; 22 extending cantilevered from a retention device base 23.

According to one embodiment, said at least one arm 21; 22 is elastically movable to allow the snap coupling of the coupling ring 8.

According to one embodiment, said retention device 4 comprises at least two mutually opposing arms 21, 22.

According to one embodiment, said two opposing arms 21, 22 comprise first inclined stretches 24 mutually diverging, elbows 25 and second inclined stretches 26 mutually converging, respectively, for aiding the snap coupling.

According to one embodiment, said retention device 4 defines a maximum footprint distance of the two opposing arms (hereinafter indicated with numeral Ddr).

According to one embodiment, said retention device 4 comprises a base 23 arranged parallel to pad 3 or to the pad plate 32.

According to one embodiment, said base 23 comprises a base hole 27.

According to one embodiment, said base 23 receives, in said base hole 27, a locking rivet to plate 28.

According to one embodiment, said base 23 receives, in said base hole 27, a protuberance 31 riveted to form a stop or riveting 30 for locking the base to the plate 32 of pad 3.

According to one embodiment, said transverse dimension or diameter of the second seat portion is greater than said outer transverse dimension or outer diameter of the coupling ring:

$Dsp > Dre$ to form said coupling ring radial clearance with respect to seat Gr.

According to one embodiment, said dimension or height of the coupling ring in the thrust direction of the actuation device (X-X) is less than said distance between the seat bottom wall and the stopping element wall:

$drx < ds$ to form said coupling ring axial clearance with respect to seat Ga.

According to one embodiment, said transverse dimension or inside inner diameter of the stopping element is smaller than said outer transverse dimension or outer diameter of the coupling ring:

$Dse < Dre$ to prevent the coupling ring 8 from escaping from seat 6.

According to one embodiment, said minimum inner transverse dimension or minimum inner diameter of coupling ring is smaller than said maximum transverse footprint distance of opposing arms of the retention device:

$Dri < Ddr$ thus allowing the snap coupling of the retention device 4 in said coupling ring 8.

The present invention also relates to an actuation device of a disc brake caliper 5. Said caliper forms part of a brake caliper and at least one pad 1 assembly comprising said brake caliper 2 and at least one brake pad 3.

Said at least one brake pad 3 comprises at least one pad retention device 4.

Said retention device 4 is securely attached to said brake pad 3 so as to prevent a related movement thereof with respect to the brake pad 3 during the normal use thereof. Said brake caliper 2 comprising at least one actuation device 5 of movement and application of a braking action, along a thrust direction X-X, to said brake pad 3 to abut it against at least one braking surface 11 of a disc of a disc brake 12.

Said actuation device defines a radial direction Z-Z orthogonal to the thrust direction of the actuation device X-X.

Advantageously, each actuation device 5 comprises at least one actuation device seat 6 having at least one seat opening 13 substantially facing said brake pad 3.

Said seat 6 receives at least one retention device coupling portion 14 of the retention device 4 through said seat opening 13.

Said actuation device 5 comprises at least one coupling ring 8.

Said coupling ring 8 is accommodated in said seat 6 leaving a radial clearance Gr between said coupling ring 8 and said seat 6.

Said coupling ring 8 is free to move in a radial direction parallel to the thrust device radial direction Z-Z.

Said coupling ring 8 is accommodated in said seat 6 leaving an axial clearance Ga between said coupling ring 8 and said seat 6.

Said coupling ring 8 is free to move in an axial direction parallel to the thrust device thrust direction X-X and is limited in its stroke so as to prevent it from escaping from said seat 6 during the normal use.

Said retention device coupling portion 14 of said retention device 4 is removably snappingly coupled to said coupling ring 8, removably connecting the at least one brake pad 3 with the at least one actuation device 5 during the normal use of the at least one brake pad 3.

The present invention also relates to a brake caliper of a disc brake 2 in which said caliper forms part of a brake caliper and at least one pad 1 assembly comprising said brake caliper 2 and at least one brake pad 3.

Said at least one brake pad 3 comprises at least one pad retention device 4.

Said retention device 4 is securely attached to said brake pad 3 so as to prevent a related movement thereof with respect to the brake pad 3 during the normal use thereof.

Said brake caliper 2 comprises at least one actuation device 5 of movement and application of a braking action, along a thrust direction X-X, to said brake pad 3 to abut it against at least one braking surface 11 of a disc of a disc brake 12.

Said actuation device defines a radial direction Z-Z orthogonal to the thrust direction of the actuation device X-X.

Advantageously, each actuation device 5 comprises at least one actuation device seat 6 having at least one seat opening 13 substantially facing said brake pad 3.

Said seat 6 receives at least one retention device coupling portion 14 of the retention device 4 through said seat opening 13.

Said actuation device 5 of said caliper 2 comprises at least one coupling ring 8 and said coupling ring 8 is accommodated in said seat 6 leaving a radial clearance Gr between said coupling ring 8 and said seat 6.

Said coupling ring 8 is free to move in a radial direction parallel to the thrust device radial direction Z-Z. Said coupling ring 8 is accommodated in said seat 6 leaving an axial clearance Ga between said coupling ring 8 and said seat 6.

Said coupling ring 8 is free to move in an axial direction parallel to the thrust device thrust direction X-X and is limited in its stroke so as to prevent it from escaping from said seat 6 during the normal use.

Said retention device coupling portion 14 of said retention device 4 is removably snappingly coupled to said coupling ring 8, removably connecting the at least one brake pad 3 with the at least one actuation device 5 during the normal use of the at least one brake pad 3.

Due to the features of this solution, a coupling of the pad to the actuation devices may be provided, for example to the thrust pistons of a caliper, by means of a simple retention construction with clearance provided directly in the caliper, in the actuation device, thus being simple to construct and manage for maintenance. Indeed, each time the pads are replaced, only the fixed retention device is replaced and not also the coupling portion, which provides defining clearances useful for compensating for the construction tolerances.

Moreover, these inventive solutions are always capable of compensating for the braking system tolerances, particularly the operating ones, and also the assembly ones.

These solutions also speed up the assembly operations of the pad in the caliper in case of maintenance and replacement of the worn pads with new pads. Indeed, this solution provides for a spring coupling device to be fixed to the pad itself in an optimal position thereof, thus never eccentric with respect to the theoretical assembly position. Therefore again, during production, assembly, packaging and transport, the retention device will be in a fixed position with respect to the pad, again centered with respect to the seat that should receive it in the piston, thus making the coupling operations, and therefore the pad replacement operations, very easy and even minor.

Moreover, when there are provided several pistons on each caliper side and therefore pads suitable for facing several pistons, the simplicity of replacement becomes even more apparent by not having to simultaneously center a plurality of retention devices, rather finding them always perfectly aligned with the seats of the actuation devices.

Due to the clearances Gr and Ga provided, the radial and tangential locking engagement of the retention devices in the piston will prevent inducing undesired transverse forces on the brake piston, thus preventing it from tilting and therefore preventing to cause undesired friction during the movement of the piston itself. Obviously, said axial clearance Ga is cancelled when the pad retention device is inserted into the coupling ring. Moreover, the manufacturing tolerances of the pad and of the caliper at times generate an uncentered positioning in circumferential direction of the pad with respect to the piston, which in any case is compensated for by the solutions herein provided. This means that further undesired transverse forces are prevented on the piston and on the caliper body. In turn, this accordingly results in a thrust of the piston that is substantially perfectly transverse to the pad, and therefore to the brake disc, always being ensured. The results will be a lack of or a drastic reduction of the variations of the braking torque of the brake, for example preventing undesired vibrations such as steering-wheel vibrations and therefore at times preventing noise or low-frequency buzzing and/or high-frequency whistles.

Thus, the need is met to couple the brake pad to the actuation device, thus preventing stresses which are at least transverse to the thrust direction of the actuation device, and at the same time manufacturing the pad is simplified and the assembly operations of the pad or replacement operations of the worn pad are facilitated.

In particular, the need is met to make the assembly operation, and therefore the vehicle maintenance, quick, in particular of the braking system when replacing the brake pads, however always while ensuring the maximum reliability, safety of the operation.

Those skilled in the art may make many changes, and adaptations to the embodiments described above or can replace elements with others which are functionally equivalent in order to meet contingent needs without however departing from the scope of protection of the appended claims.

LIST OF REFERENCES

1 Brake caliper and at least one pad assembly or assembly
2 brake caliper
3 at least one brake pad
4 pad retention device or retention device
5 actuation device 6 actuation device seat or seat
7 actuation device seat delimiting walls or seat walls
8 coupling ring
9 coupling ring radial clearance or radial clearance
10 coupling ring axial clearance or axial clearance
11 braking surface of the brake disc
12 disc of a disc brake
13 seat opening
14 retention device coupling portion
15 first seat portion
16 second seat portion
17 stopping element or stopping ring
18 first seat portion walls
19 seat bottom wall
20 stopping element wall
21 retention device arm
22 retention device arm
23 retention device base
24 first stretch of diverging arm
25 elbow
26 second stretch of converging arm
27 base hole
28 locking rivet to the plate
29 stopping element body
30 riveting
31 plate protuberance
32 pad plate
A-A axial direction of the disc brake parallel to or coincident with the rotation axis of the brake disc
R-R radial direction orthogonal to the axial direction A-A
T-T or C-C tangential or circumferential direction orthogonal to the axial direction A-A and to the radial direction R-R
X-X thrust direction of the actuation device
Z-Z radial direction orthogonal to the thrust direction of the actuation device X-X
Gr coupling ring radial clearance with respect to the seat
Ga coupling ring axial clearance with respect to the seat
Dfp transverse dimension or diameter of the first seat portion
Dsp transverse dimension or diameter of the second seat portion
ds distance between the seat bottom wall and the stopping element wall
Des transverse dimension or inside inner diameter of the stopping element
Dre outer transverse dimension or outer diameter of the coupling ring
Dri minimum inner transverse dimension or minimum inner diameter of coupling ring
Ddr maximum transverse footprint distance of opposing arms of retention device
drx dimension or height of coupling ring in direction X-X

The invention claimed is:
1. A brake caliper and a pad assembly comprising:
a brake caliper;
a brake pad;
said brake pad comprising a pad retention device;
said pad retention device being securely attached to said brake pad so as to prevent a relative movement thereof with respect to the brake pad during normal use thereof;
said brake caliper comprising an actuation device of movement and application of a braking action, along a thrust direction, to said brake pad to abut it against a braking surface of a disc of a disc brake;
said actuation device defining a radial direction orthogonal to the thrust direction of the actuation device;
wherein
said actuation device comprises an actuation device seat having a seat opening substantially facing said at last one brake pad,
said actuation device seat receives a retention device coupling portion of the pad retention device through said seat opening; and wherein
said assembly comprises a coupling ring, wherein
said coupling ring is accommodated in said actuation device seat, leaving a radial clearance between said coupling ring and said actuation device seat, said coupling ring is free to move in a radial direction parallel to the thrust device radial direction,
said coupling ring is accommodated in said actuation device seat, leaving an axial clearance between said coupling ring and said actuation device seat, said coupling ring is free to move in an axial direction parallel to the thrust device thrust direction and is limited in its stroke so as to be prevented from escaping from said actuation device seat during normal use thereof; and
said retention device coupling portion of said pad retention device is snappingly and removably coupled to said coupling ring, removably connecting the brake pad with the actuation device during normal use of the brake pad.
2. The assembly of claim 1, wherein
said actuation device seat is delimited by seat walls,
said coupling ring is accommodated in said actuation device seat, leaving a radial clearance between said coupling ring and said actuation device seat, said coupling ring is free to move in a radial direction parallel to the thrust device radial direction limited by the seat walls, and
said coupling ring is accommodated in said actuation device seat, leaving an axial clearance between said coupling ring and said actuation device seat, said coupling ring is free to move in an axial direction parallel to the thrust device thrust direction and is limited in its stroke at least on one side by the seat walls so as to be prevented from escaping from said actuation device seat during normal use thereof.
3. The assembly of claim 1, wherein
said actuation device seat comprises a seat bottom wall,
said assembly comprises a stopping element arranged on a side substantially opposite to said seat bottom wall, said stopping element projects at least partially in said actuation device seat for delimiting the stroke of said coupling ring,
said actuation device seat has a first seat portion having a predefined transverse dimension or inside inner diameter, and alternatively but not necessarily,
said first seat portion is at least partially within the seat walls forming a coupling seat with a portion thereof not directly facing said seat opening, and alternatively but not necessarily,
said actuation device seat comprises a second seat portion having a predefined transverse dimension or inside inner diameter.
4. The assembly of claim 1, wherein
said assembly comprises a stopping element received in a first seat portion,
said stopping element is received and snappingly coupled in said first seat portion, and alternatively but not necessarily,
said stopping element is received and screwed to said first seat portion, and alternatively but not necessarily, a stopping element wall faces a seat bottom wall, and alternatively but not necessarily, a distance from the seat bottom wall and the stopping element wall is defined, and wherein a stopping element inner transverse dimension or inner diameter is defined, and said stopping element comprises a stopping element body which has an open annular extension for snap insertion into said first seat portion.

5. The assembly of claim 1, wherein said coupling ring has a predefined coupling ring outer transverse dimension, or outer diameter, said coupling ring has a predefined coupling ring minimum inner transverse dimension, or minimum inner diameter, and said coupling ring has a predefined coupling ring dimension in the direction of the thrust direction.

6. The assembly of claim 1, wherein said pad retention device comprises a retention device arm extending cantilevered from a retention device base, wherein said retention device arm is elastically movable to allow snap coupling of the coupling ring, and alternatively but not necessarily, said pad retention device comprises at least two mutually opposing arms, wherein said two opposing arms respectively comprise mutually diverging first inclined stretches, elbows and mutually converging second inclined stretches for aiding snap coupling; and wherein said pad retention device defines a maximum transverse footprint distance of the two opposing arms, and said pad retention device comprises a base arranged parallel to the brake pad or to a pad plate, wherein said base comprises a base hole, said base receives in said base hole a locking rivet to plate, and alternatively but not necessarily, said base receives in said base hole a protuberance riveted to form a stop or riveting for locking the base to the pad plate of the brake pad.

7. The assembly of claim 1, wherein said transverse dimension or diameter of the second seat portion is greater than said outer transverse dimension or diameter of the coupling ring:

(Dsp>Dre)

to form said coupling ring radial clearance with respect to the seat, and said dimension or height of the coupling ring in the thrust direction of the actuation device is smaller than said distance between the seat bottom wall and the stopping element wall:

(drx<ds)

to form said coupling ring axial clearance with respect to the seat.

8. The assembly of claim 1, wherein said transverse dimension or inner diameter of the stopping element is smaller than said outer transverse dimension or outer diameter of the coupling ring:

(Dse<Dre)

to prevent the coupling ring from escaping from the actuation device seat.

9. The assembly of claim 1, wherein said minimum inner transverse dimension or minimum inner diameter of the coupling ring is smaller than said maximum transverse footprint distance of the opposing arms of the retention device:

(Dri<Ddr)

allowing snap coupling of the retention device in said coupling ring.

10. An actuation device of a disc brake caliper, wherein said disc brake caliper is part of a brake caliper assembly and a pad comprising:

a brake caliper and a brake pad, said brake pad comprising a pad retention device, said pad retention device being securely attached to said brake pad so as to prevent a relative movement thereof with respect to the brake pad during normal use thereof;

said brake caliper comprising an actuation device of movement and application of a braking action, along a thrust direction, to said brake pad to abut it against a braking surface of a disc of a disc brake, said actuation device defines a radial direction orthogonal to the thrust direction of the actuation device, wherein said actuation device comprises an actuation device seat having a seat opening substantially facing said brake pad, wherein said actuation device seat receives a retention device coupling portion of the pad retention device through said seat opening, and wherein said actuation device comprises a coupling ring, and wherein said coupling ring is accommodated in said actuation device seat leaving a radial clearance between said coupling ring and said actuation device seat, said coupling ring is free to move in a radial direction parallel to the thrust device radial direction, and wherein said coupling ring is accommodated in said actuation device seat, leaving an axial clearance between said coupling ring and said actuation device seat, said coupling ring is free to move in an axial direction parallel to the thrust device thrust direction and is limited in its stroke so as to be prevented from escaping from said actuation device seat during normal use thereof, and wherein said retention device coupling portion of said pad retention device is snappingly and removably coupled to said coupling ring, removably connecting the brake pad with the actuation device during normal use of the brake pad.

11. A brake caliper of a disc brake, wherein said brake caliper is part of a brake caliper assembly and a pad comprising said brake caliper and a brake pad;

said brake pad comprising a pad retention device;

said pad retention device being securely attached to said brake pad so as to prevent a relative movement thereof with respect to the brake pad during normal use thereof;

said brake caliper comprising an actuation device of movement and application of a braking action, along a thrust direction, to said brake pad to abut it against a braking surface of a disc of a disc brake;

said actuation device defines a radial direction orthogonal to the thrust direction of the actuation device;

wherein said actuation device comprises an actuation device seat having a seat opening substantially facing said brake pad, wherein said actuation device seat receives a retention device coupling portion of the retention device through said seat opening; and wherein said actuation device comprises a coupling ring; and wherein said coupling ring is accommodated in said actuation device seat leaving a radial clearance between said coupling ring and said actuation device seat, said coupling ring is free to move in a radial direction parallel to the thrust device radial direction; and wherein said coupling ring is accommodated in said actuation device seat leaving an axial clearance between said coupling ring and said actuation device seat, said coupling ring is free to move in an axial direction parallel to the thrust device thrust direction and is limited in its stroke so as to be prevented from escaping from said actuation device seat during normal use thereof; and wherein said retention device coupling portion of said pad retention device is snappingly and removably coupled to said coupling ring, removably connecting the brake pad with the actuation device during normal use of the brake pad.

\* \* \* \* \*